United States Patent Office 2,772,023
Patented Nov. 27, 1956

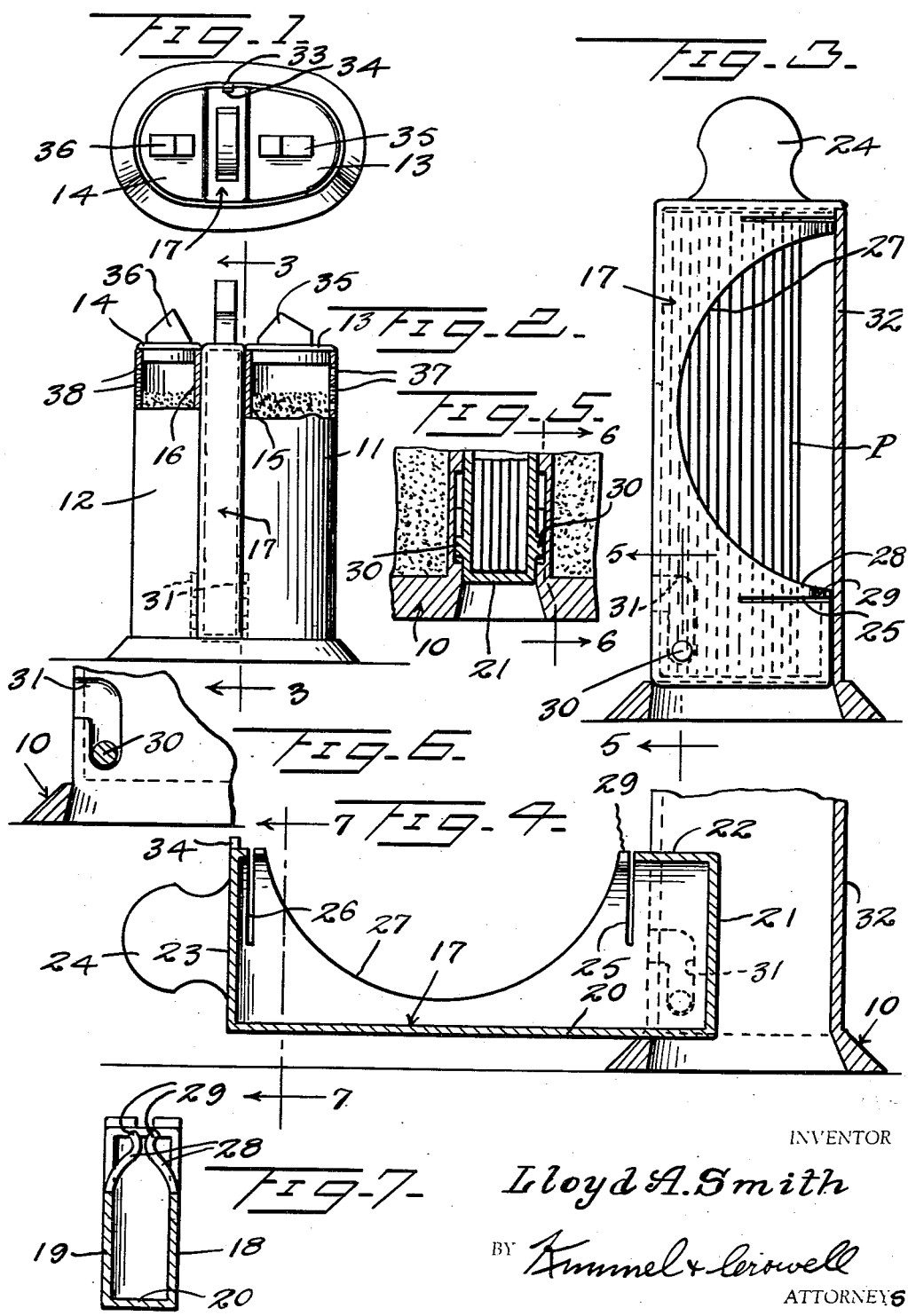

2,772,023

CONDIMENT AND TOOTHPICK HOLDER AND DISPENSER

Lloyd A. Smith, Washington, D. C., assignor of one-fourth to Morris E. Smith, Washington, D. C.

Application February 4, 1952, Serial No. 269,826

1 Claim. (Cl. 221—282)

This invention relates to condiment shakers.

An object of this invention is to provide a condiment shaker which includes a base having a pair of upstanding condiment receptacles fixed thereto with a space between the receptacles and a toothpick holder engaging between the receptacles.

Another object of this invention is to provide an improved toothpick holder for mounting between a pair of condiment shakers, the toothpick holder being so constructed and arranged that the toothpicks can only be removed one at a time.

A further object of this invention is to provide in a condiment shaker an improved toothpick holder which may be made out of plastic of the same or a different color from the shaker.

A further object of this invention is to provide a combined condiment shaker and toothpick holder which is so constructed that in the normal dispensing of the condiments the toothpicks will be locked in the toothpick holder.

With the above and other objects in view, my invention consists in the arrangement, combination and details of construction disclosed in the drawing and specification, and then more particularly pointed out in the appended claim.

In the drawing:

Figure 1 is a plan view of a combined condiment shaker and toothpick holder constructed according to an embodiment of this invention.

Figure 2 is a detailed side elevation partly broken away and in section of the device.

Figure 3 is a sectional view taken on the line 3—3 of Figure 2.

Figure 4 is a view similar to Figure 3 showing the toothpick holder in dispensing position.

Figure 5 is a fragmentary sectional view taken on the line 5—5 of Figure 3.

Figure 6 is a fragmentary sectional view taken on the line 6—6 of Figure 5.

Figure 7 is a sectional view taken on the line 7—7 of Figure 4.

Referring to the drawing, the numeral 10 designates generally a base which is substantially elliptical or ovoidal in plan. A pair of condiment receptacles 11 and 12 are secured to and extend upwardly from the base 10, and the receptacles 11 and 12 have removable caps 13 and 14 respectively at their upper ends. The receptacles 11 and 12 are provided with flat and confronting inner walls 15 and 16 respectively which are disposed in spaced parallel relation so as to provide a space within which a toothpick holder, generally designated as 17, is adapted to be mounted. The toothpick holder 17 is formed of parallel side walls 18 and 19 connected together by a longitudinal wall 20. A bottom wall 21 is connected between the side walls 18 and 19, and a second relatively short longitudinal wall 22 extends from the bottom wall 21. A top wall 23 is secured between the side walls 18 and 19 and a knob or handle 24 is fixed to and extends upwardly from the top wall 23. The side walls 18 and 19 are of like construction and each side wall is formed with a pair of slits 25 and 26 disposed closely adjacent the upper and lower ends of the side walls so as to thereby separate a substantial portion of the side walls, the purpose for which will be hereinafter described.

Each side wall is formed with a relatively deep concave cutout 27, and at the ends of the cutout 27 there are formed inwardly bent fingers 28. The fingers 28, at their outer terminal portions, are bent reversely, as indicated at 29, and the confronting fingers 28 are disposed in slightly spaced relation to each other. These fingers 28 provide a means for resiliently locking the toothpicks within the holder and at the same time permit an upper toothpick P to be pulled upwardly between the fingers 28 so as to remove the upper toothpick from the holder.

The relatively deep cutouts 27 in each side wall of the toothpick holder provide a means for exposing the major portions of the toothpicks so that the latter may be readily grasped between a pair of fingers and pulled upwardly and between the resilient fingers 28. The holder 17 is rockably disposed in the space between the inner walls 15 and 16 of the condiment receptacles, and the side walls 18 and 19 have projecting therefrom short pins 30 which loosely engage in inverted L-shaped slots 31 formed in the lower portions of the inner walls 15 and 16. The slots 31 open forwardly, as shown in Figure 6, so that the toothpick holder 17 may, if desired, be removed completely from the space between the condiment receptacles 11 and 12.

When the toothpick holder is in dispensing position, as shown in Figure 4, the longitudinal wall 20 will rest on the base 10. The condiment receptacles 11 and 12 are connected together on one side thereof by means of a connecting wall 32, and the upper end of wall 32 has extending therefrom a lug 33, which is adapted to engage in a slot 34 formed in the top wall 23 of toothpick holder 17.

The lug 33 forms a locking means engageable in the slot or keeper 34 so as to lock the toothpick holder in a non-dispensing position.

This device is adapted to be made out of plastic or other similar material, and the receptacles 11 and 12 may be made of one color and the toothpick holder 17 may be made of the same color as the receptacles or may be made of a differentiating color.

The caps 13 and 14 on the upper ends of the receptacles 11 and 12 have lugs or handles 35 and 36 respectively extending therefrom so that the caps 13 and 14 may be removed from the receptacles to provide for filling the latter with the desired material, such as salt and pepper.

The receptacles 11 and 12 have a plurality of small dispensing openings 37 and 38 disposed adjacent the upper ends thereof with the openings 37 and 38 oppositely disposed so that the material from one receptacle may be shaken out therefrom without removal of the contents of the other receptacle.

The toothpick holder 17 provides a means whereby toothpicks will be held between the condiment receptacles 11 and 12 so that the toothpicks in the holder will be kept free from dust. The provision of the cut-outs 27 in the side walls of the toothpick holder provide a means whereby the toothpicks can only be taken out one at a time and the toothpicks are removed by grasping the same at a point between the ends thereof so that the toothpicks will be maintained in a hygienic condition.

If desired, the unit 17, instead of being formed to hold toothpicks can be made of solid walls and ends and with perforations in front near the top of the outside wall, similar to those perforations in the other receptacles, whereby to provide for having means to dispense three condiments instead of only two, the construction of unit 17 and the means for retaining it being otherwise the same.

I do not mean to confine myself to the exact details of construction herein disclosed, but claim all variations falling within the purview of the appended claim.

What I claim is:

A toothpick holder and dispenser comprising a normally horizontal base, said base having a pair of integrally formed substantially rectangular side walls projecting upwardly therefrom in spaced substantially parallel relation, an end wall projecting upwardly from said base and formed integrally therewith, said end wall extending substantially parallel to said side walls and integrally connecting a pair of adjacent upwardly extending edges thereof, said side and end walls defining a receptacle having an open end and top, a toothpick holder comprising a substantially rectangular parallelepipedon having spaced and parallel pairs of side and end walls, and spaced parallel top and bottom walls, each of said side walls having an arcuate cut out formed therein in registry with each other, said cut outs extending from a point adjacent said top wall to a point adjacent said bottom wall, one of said end walls having a cut out portion extending from said point adjacent said top wall to said point adjacent said bottom wall, said side walls each having a slit formed therein adjacent said top and bottom walls, said slits extending inwardly from said one end wall to form vertically spaced pairs of horizontally spaced tines, said horizontally spaced tines of each pair being bent arcuately towards each other into substantially abutting relationship, said parallelepipedon being normally disposed within said receptacle, and bayonet and slot means detachably securing said parallelepipedon and said receptacle with said one end wall of said parallelepipedon confronting said one end wall of said receptacle.

References Cited in the file of this patent

UNITED STATES PATENTS

| | | |
|---|---|---|
| 371,621 | Offrell | Oct. 18, 1887 |
| 509,942 | Porstendorfer | Dec. 5, 1893 |
| 640,763 | Hale | Jan. 9, 1900 |
| 1,009,060 | Fisher | Nov. 21, 1911 |
| 1,048,285 | Brand | Dec. 24, 1912 |
| 1,522,776 | Glanzer | Jan. 13, 1925 |
| 2,499,687 | Smith | Mar. 7, 1950 |

FOREIGN PATENTS

| | | |
|---|---|---|
| 58,969 | Switzerland | Sept. 23, 1911 |
| 162,098 | Switzerland | Aug. 16, 1933 |